(12) United States Patent
Edsall et al.

(10) Patent No.: US 9,001,830 B2
(45) Date of Patent: Apr. 7, 2015

(54) ULTRA LOW LATENCY MULTI-PROTOCOL NETWORK DEVICE

(71) Applicant: Cisco Technology, Inc., San Jose, CA (US)

(72) Inventors: Thomas J. Edsall, Los Gatos, CA (US); Alessandro Fulli, San Jose, CA (US); Putu Harry Subagio, Cupertino, CA (US); Mingzhe Li, Fremont, CA (US); Christopher A. Wildman, Alamo, CA (US); Yichou Lin, San Jose, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 13/708,200

(22) Filed: Dec. 7, 2012

(65) Prior Publication Data

US 2014/0079062 A1  Mar. 20, 2014

Related U.S. Application Data

(60) Provisional application No. 61/702,317, filed on Sep. 18, 2012.

(51) Int. Cl.
*H04L 12/28* (2006.01)
*H04L 12/721* (2013.01)
(Continued)

(52) U.S. Cl.
CPC ............ *H04L 45/38* (2013.01); *H04L 47/2441* (2013.01); *H04L 47/2483* (2013.01); *H04L 47/20* (2013.01)

(58) Field of Classification Search
CPC .................................................. H04L 29/0653
See application file for complete search history.

(56) References Cited

U.S. PATENT DOCUMENTS 6,892,237 B1   5/2005   Gai et al.
7,106,731 B1   9/2006   Lin et al.
(Continued)

FOREIGN PATENT DOCUMENTS

EP   2262186 A1   12/2010

OTHER PUBLICATIONS

Cisco Systems, Inc., "Cisco Nexus 3000 Series NX-OS Release Notes, Release 5.0(3)U2(1)," pp. 1-12, Aug. 31, 2011.
(Continued)

*Primary Examiner* — Afshawn Towfighi
(74) *Attorney, Agent, or Firm* — Edell, Shapiro & Finnan, LLC

(57) ABSTRACT

Presented herein are techniques to achieve ultra low latency determination of processing decisions for packets in a network device. A packet is received at a port of a network device. A processing decision is determined in a first processing decision path based on content of the packet and one or more network policies. A processing decision is determined in a second processing decision path, in parallel with the first processing path, by accessing a table storing processing decisions. The second processing decision path can output a processing decision faster than the first processing decision path for packets that match one or more particular packet flow parameters contained in the table. A processing decision determined by the second processing decision path, if one can be made, is used, and otherwise a processing decision determined by the first processing decision path is used.

29 Claims, 4 Drawing Sheets

(51) Int. Cl.
*H04L 12/851* (2013.01)
*H04L 12/813* (2013.01)

(56) References Cited

U.S. PATENT DOCUMENTS

| | | |
|---|---|---|
| 7,395,332 B2 | 7/2008 | Gai et al. |
| 7,474,666 B2 | 1/2009 | Kloth et al. |
| 7,656,818 B1 | 2/2010 | Baroudi et al. |
| 7,830,793 B2 | 11/2010 | Gai et al. |
| 7,899,048 B1 | 3/2011 | Walker et al. |
| 7,961,621 B2 | 6/2011 | Bergamasco et al. |
| 7,969,971 B2 | 6/2011 | Gai et al. |
| 8,208,389 B2 | 6/2012 | Alaria et al. |
| 8,640,036 B2 | 1/2014 | Pignataro et al. |
| 2009/0238184 A1* | 9/2009 | Darnell et al. ............ 370/392 |
| 2010/0158009 A1* | 6/2010 | Lee et al. ................. 370/392 |
| 2012/0177046 A1* | 7/2012 | Yamada et al. ........... 370/392 |

OTHER PUBLICATIONS

International Search Report and Written Opinion in counterpart International Application No. PCT/US2013/059171, mailed Feb. 24, 2014, 10 pages.

* cited by examiner

ULTRA LOW LATENCY MULTI-PROTOCOL NETWORK DEVICE

CROSS REFERENCE TO RELATED APPLICATION

This application claims priority to U.S. Provisional Patent Application No. 61/702,317, filed Sep. 18, 2012, entitled "Ultra Low Latency Multi-Protocol Networking Device," the entirety of which is incorporated herein by reference.

TECHNICAL FIELD

The present disclosure relates generally to reducing latency in a network device.

BACKGROUND

Ultra Low Latency (ULL) networks are critical to certain users, such as High Frequency Trading (HFT) users, where every nanosecond counts. In particular, being faster than competition enables HFT customers to increase order flow, liquidity, accelerate price discovery and capture opportunities during periods of volatility.

Conventional network devices, such as switches, have been built upon a legacy approach where decisions are made serially. Although this simplifies design considerations, the serial approach also introduces inherent latencies since decisions are postponed and significant resources (i.e., duplicated tables) are needed.

DESCRIPTION OF EXAMPLE EMBODIMENTS

Overview

Presented herein are techniques to achieve ultra low latency determination of processing decisions for packets in a network device. A packet is received at a port of a network device. A processing decision is determined in a first processing decision path based on content of the packet and one or more network policies. A processing decision is determined in a second processing decision path, in parallel with the first processing path, by accessing a table storing processing decisions. The second processing decision path can output a processing decision faster than the first processing decision path for packets that match one or more particular packet flow parameters contained in the table. A processing decision determined by the second processing decision path, if one can be made, is used, and otherwise a processing decision determined by the first processing decision path is used.

Example Embodiments

In a computer network, data is transmitted from a source to a destination in the form of packets that generally pass through one or more network devices (e.g., switches, routers, firewalls, etc.). During the transmission, the network devices may perform one or more operations that introduce latency into the packet transmission process.

Figure 1:
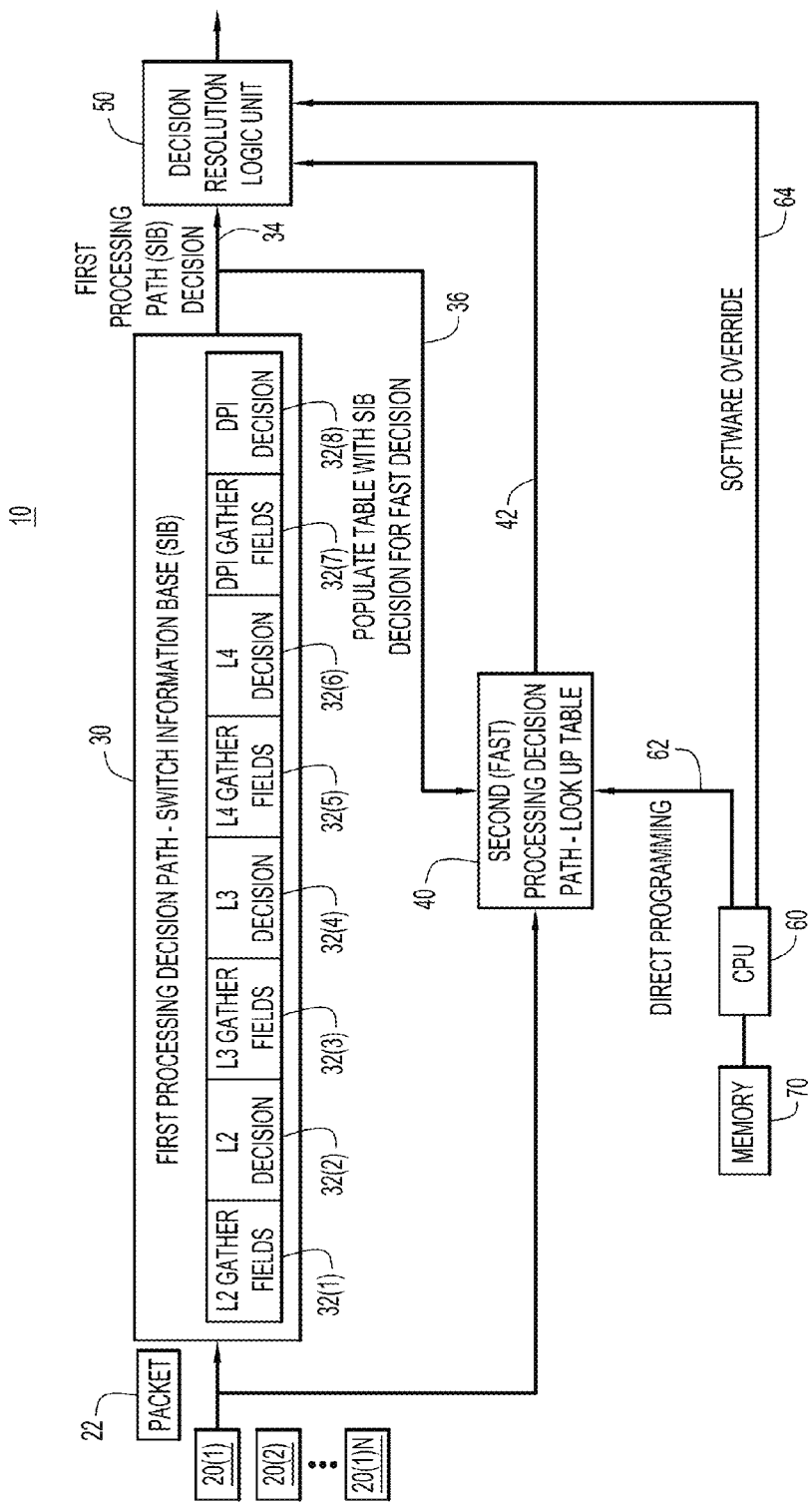
FIG. 1 is a block diagram of a network device having multiple processing decision paths, including a fast processing decision path configured to make ultra-low latency processing decisions on packets.

Reference is made to FIG. 1. FIG. 1 illustrates a block diagram of a network device 10 and showing primarily those components of the network device 10 that are relevant to the ultra low latency processing decision techniques presented herein. The network device 10 comprises a plurality of ports 20(1)-20(N) at which packets arrive to the network device from a network and from which packets depart from the network device to the network. Any of the ports 20(1)-20(N) may serve as an ingress port or an egress port. A single packet is shown at reference numeral 22 in FIG. 1.

The network device 10 further comprises a first processing decision path 30, a second processing decision path 40 and a decision resolution logic unit 50. The first processing decision path 30 is, for example, a switching information base (SIB), that comprises a plurality of processing units 32(1)-32(8) which sequentially perform decision operations based on content of a packet and one or more network policies, as described further hereinafter. The second processing decision path 40 can produce a processing decision of a packet much faster than the first processing decision path 30 if the packet has flow parameters that match one or more particular flow parameters stored in a table of the second processing decision path 40. That is, the second processing decision path 40 consists primarily of a table (as described further hereinafter in connection with FIG. 2). The second processing decision path 40 may not always be capable of producing a processing decision for a packet, and in fact, will produce a processing decision for a packet only when the packet has flow parameters that match one or more particular flow parameters stored in the table of the second processing decision path 40.

In conventional network devices, only a SIB or equivalent functional component is available to make packet processing decisions based on the content of the arriving packets and network policies. The SIB may handle protocol control packets such as Open Shortest Path First (OSPF) and Border Gateway Protocol (BGP) packets. Once these protocols converge on a decision, a switching action is taken on future arriving matching packets. Scale is achieved by these switching information base components with indirection. For example, a match to switching decisions is placed in the switching information base and subsequent action is found in a result database. Multiple matches can point to the same result database to take the same action. This method incurs latency, but achieves scalability. Presented herein are techniques to achieve ultra low latency by programming selective processing decisions in the second processing decision path 40 that operates in parallel with the first processing decision path 30. The second processing decision path 40 may be referred to as a configurable switch unit.

The processing units 32(1)-32(8) of the first processing decision path are now described. As is known in the art, a packet transported across a network includes a header portion and a payload. The header typically includes information about the source and destination of the packet, and other information at Layer 2 (L2), Layer 3 (L3) and Layer 4 (L4), as well as in Deep Packet Inspection (DPI) fields. Thus, in any given packet, there is packet flow parameter information in Layer 2 fields, Layer 3 fields, Layer 4 fields, and Deep Packet Inspection fields that is useful to determine what processing decision to make for the packet. Thus, the first processing decision path 30 includes logic to sequentially examine all of these fields in the header of a packet in order to make a processing decision for the packet. There is a L2 gather fields unit 32(1) that gathers all of the L2 fields for making a L2 processing decision. The L2 decision unit 32(2) makes the L2 processing decision based on the L2 fields. There is a L3 gather fields unit 32(3) that gathers all of the L3 fields, and a L3 decision unit 32(4) makes a L3 processing decision on the L3 fields. Similarly, there is a L4 gather fields unit 32(5) to gather L4 fields and a L4 decision unit 32(6) to make a L4 processing decision based on the L4 fields. Finally, there is a DPI gather fields unit 32(7) to gather DPI fields and a DPI decision unit 32(8) that makes a DPI processing decision based on the DPI fields.

The packet flow information about the packet, e.g., Layer 2 fields, Layer 3 fields, etc., that is supplied to the first processing decision path 30 is also supplied in parallel to the second processing decision path 40. However, the amount of time required to make a processing decision on a packet using the first processing path 30 can be considerable since all of the relevant fields are gathered and processed as depicted in FIG. 1. The first processing decision path 30 is generally capable of making processing decisions for any packet expected to be handled by the network device. By contrast, the second processing decision path 40 uses a table that stores processing decisions applicable to certain packets received by the network device (e.g., the repetitive occurrence of which is expected to be relatively high). The second processing decision path 40 can output a processing decision faster than the first processing decision path 30 for packets that match one or more particular packet flow parameters stored in the table of the second processing decision path 40. The decision resolution logic unit 50 is configured to select for use a processing decision made (output) by the second processing decision path 40, if one can be made by the second processing decision path 40, and otherwise uses a processing decision made by the first processing decision path 30. Thus, the second processing decision path 40 may, in some cases, not have an entry in its table to allow it to make a processing decision for a packet. In that case, the decision resolution logic unit 50 simply uses the processing decision output by the first processing decision path 30. However, in other cases, the second processing decision path 40 may have an entry that matches one or more flow parameters of a received packet and can output a processing decision for that packet very fast, well before the first processing decision path 30. In this case, the decision resolution logic unit 50 will use the processing decision from the second processing decision path 40. The processing decision made by the first and second processing decision paths may comprise at least one of: forwarding, switching (bridging), bypassing, dropping, etc.

The processing decision output 34 of the first processing decision path 30 is coupled to the decision resolution logic unit 50 and the processing decision output 42 of the second processing decision path 40 is also coupled to the decision resolution logic unit 50. Furthermore, as shown at reference numeral 36, the processing decision output 34 of the first processing decision path 30 is fed back to the second processing decision path 40 to populate the table of the second processing decision path 40 with the processing decision output 34 (i.e., SIB decision) to enable the second processing decision path 40 to make a fast processing decision for use in processing subsequently received packets which have flow parameters that yield that particular processing decision. Thus, the learning achieved by the first processing decision path 40 (i.e., SIB) is used to populate the table in the second processing decision path 40.

Still referring to FIG. 1, in one example, the first processing decision path 30, second processing decision path 40 and decision resolution logic unit 50 all are implemented in hardware with digital logic gates. The network device 10 further includes a central processing unit (CPU) 60 and memory 70. The CPU 60 may control operations of the network device 10 through the execution of software instructions stored or encoded in memory 70. For example, as shown at 62, the CPU 60 may directly program the second processing decision path 40 to populate the table of the second processing decision path 40 with one or more entries so that the second processing decision path 40 can rapidly make processing decisions on additional types of packets.

There may be situations when it is desirable to override the processing decision made by the second processing decision path 40, if one is made by the second processing decision path 40, and instead use the processing decision made by the first processing decision path. Conversely, there may be situations where it is desirable to override the processing decision determined by the first processing path 30 and use the processing decision determined by the second processing decision path 40. To this end, at 62 the CPU 60 is coupled to the decision resolution logic unit 50 to cause the decision resolution logic 50 to override a decision made by the second processing decision path 40 and use a processing decision made by the first processing decision path 30, or vice versa.

Memory 70 may comprise read only memory (ROM), random access memory (RAM), magnetic disk storage media devices, optical storage media devices, flash memory devices, electrical, optical, or other physical/tangible memory storage devices. The CPU 60 is, for example, a microprocessor or microcontroller. Thus, in general, the memory 70 may comprise one or more tangible (non-transitory) computer readable storage media (e.g., a memory device) encoded with software comprising computer executable instructions and when the software is executed (by the CPU 60) it is operable to perform the operations described herein.

Figure 2:
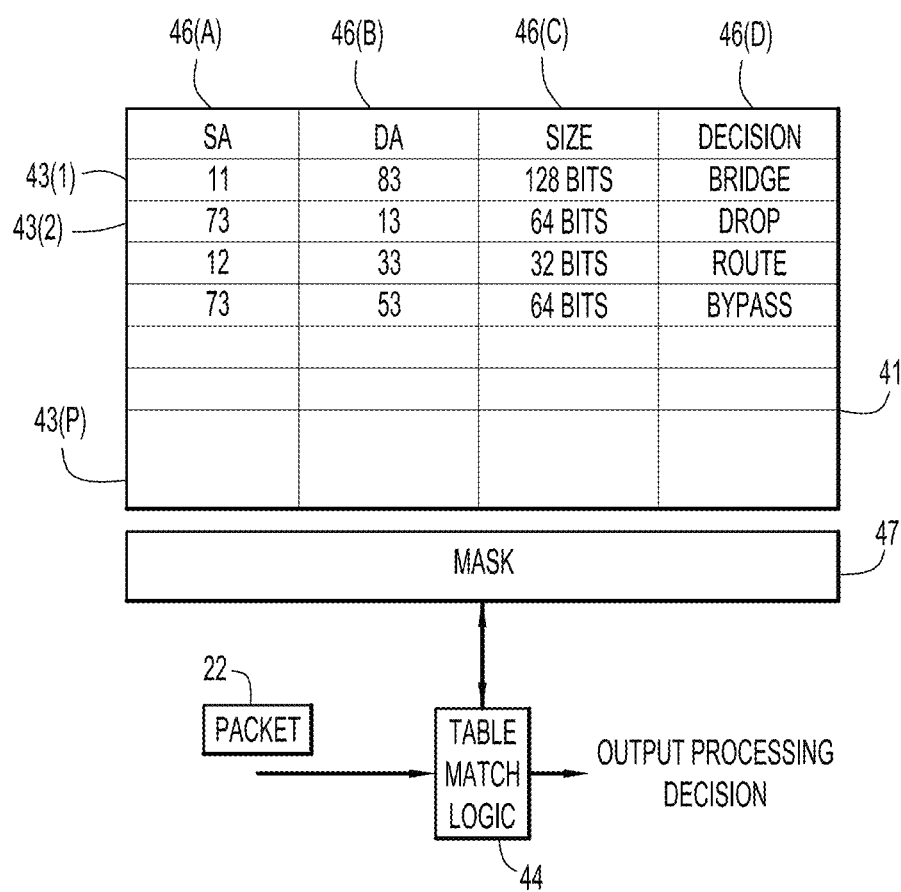
FIG. 2 is a diagram illustrating an example of a table used in the fast processing decision path of the network device of FIG. 1.

Reference is now made to FIG. 2. FIG. 2 shows one example implementation of the second processing decision path 40, which includes a table 41 and table match logic 44 that may be used to make a packet processing decision. The table 41 includes a plurality of entries 43(1)-43(P). There are multiple fields associated with each entry, such as a source address (SA) field 46(A), destination address (DA) field 46(B), size field 46(C) and fields for various other packet flow parameters. These fields may contain, in one example, Layer 2 flow parameters of packets, such that the SA field 46(A) is a Layer 2 SA, i.e., media access control (MAC) SA, the DA field 46(B) is a MAC DA, etc. Field 46(D) contains the processing decision for a packet that has flow parameters that match that given entry.

The table match logic 44 comprises digital comparison logic that compares parameters of a packet to be processed with corresponding fields in the table 41 to determine whether there is a match. For example, if a packet arrives that has an SA of "11", a DA of "83" and a size (e.g., less than) 128 bits, then a match is declared and the processing decision "Bridge" is immediately output. Similar logic follows for the other examples shown in FIG. 2, and it should be understood that the numbers used in the fields of the table 41 are solely for explanatory purposes and do not reflect real-world values of such parameters. It is possible that a match on an SA and a DA may yield an output of a processing decision, without regard to the size of the packet.

The table match logic 44 also populates the table 41 with entries (received from the first processing decision path 30 or from the CPU 60), and removes stale entries from the table 41 that have not resulted in any matches over a predetermined time period, such as the last hour, the last day, etc.). Table match logic 44 may be implemented in software, or as a combination of software and hardware.

The second processing decision path 40 may involve a single lookup in table 41, and as explained above, be involve a single table lookup using a key defined by any combination of one or more of Layer 2 fields, Layer 3 fields, Layer 4 fields, Deep Packet Inspection fields, and user defined parameters of the packet to determine a match with one or more particular packet flow parameters stored in the table. This key may be a static manually configured key for a particular combination of one or more of Layer 2 fields, Layer 3 fields, Layer 4 fields, Deep Packet Inspection fields, and user defined parameters of the packet to determine a match with one or more particular packet flow parameters stored in the table. The use of a single table lookup greatly shortens the amount of time needed to obtain a processing decision in the second processing decision path 40, if one can be made. Moreover, the table 41 stores processing decisions for packets having flow parameters for packets expected to be commonly received by the network device or packets having flow parameters that should be handled in an ultra low latency manner, and for which packets, the processing decision should be made by the second processing decision path.

The fields in the table 41 of the second processing decision path 40 can be manually programmed by protocols, by a user (via the CPU) or derived from a SIB decision an optimized into a single entry from the first processing decision path 30. Additionally, there is an optional mask 47 (embodied, for example, as a Ternary content-addressable memory) to ignore fields that are not pertinent by a bitwise comparison to allow for a partial or exact match to data stored in fields of the table 41. The mask 47 optimizes the second processing decision path key to match more than one form of a packet. To avoid packet duplication, a match in the table of the second processing decision path always wins unless explicitly marked to lose. Processing of unicast and multicast packets in this structure is the same.

In some implementation, the slower first processing decision path 30 may be used for Layer 2 hardware learning, L2 unknown unicast flooding, latency insensitive traffic and spill over if the second processing decision path is at full capacity. In one implementation of a learning mode, for each packet type that passes through the first processing decision path 30, information of how to process that packet type is obtained, and that information can be provided to the second processing decision path 40, for creation of a new table entry in the second processing decision path 40. A "key" that corresponds to the minimum amount of packet information required to designate this packet type is then used to do a table lookup by the second processing decision path for future packets that are to be processed using the parallel path structure as shown in FIG. 1. Accordingly, in a learning mode, a set of unique identifiers can be obtained based on packet type using the first processing decision path 30, and that information can provide a set of "keys" to be used in creating table entries in the second processing decision path 40.

L2 hardware learning relieves the CPU of significant CPU access and processing load. Software learning is typically less efficient as media access control (MAC) table learn requests, since each packet needs to be stored in memory and processed by software. When memory is full (e.g., when the table in the second processing decision path 40 has reached a maximum acceptable size), further learning requests can be ignored.

Figure 3:
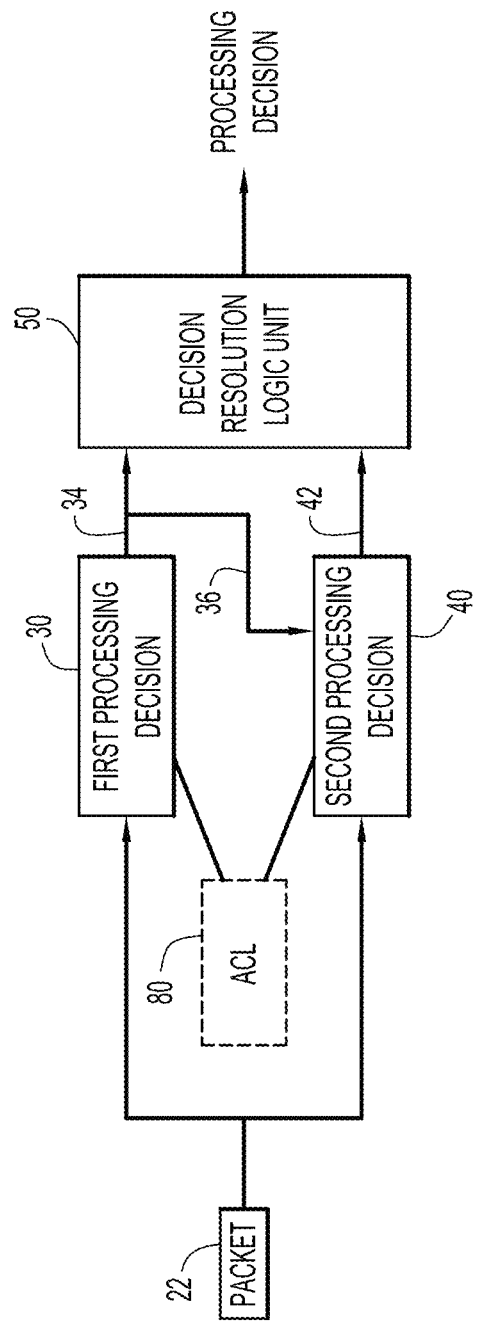
FIG. 3 is a block diagram showing multiple processing decision paths sharing an access control list table.

Turning now to FIG. 3, a diagram is shown for a variation of the configuration shown in FIG. 1. In this configuration, the first processing decision path 30 and second processing decision path 40 share an access control list (ACL) table 80 for making processing decisions. Thus, the table 41 used by the second processing decision path 40 is ACL table 80, which is also used by the first processing decision path 30.

Figure 4:
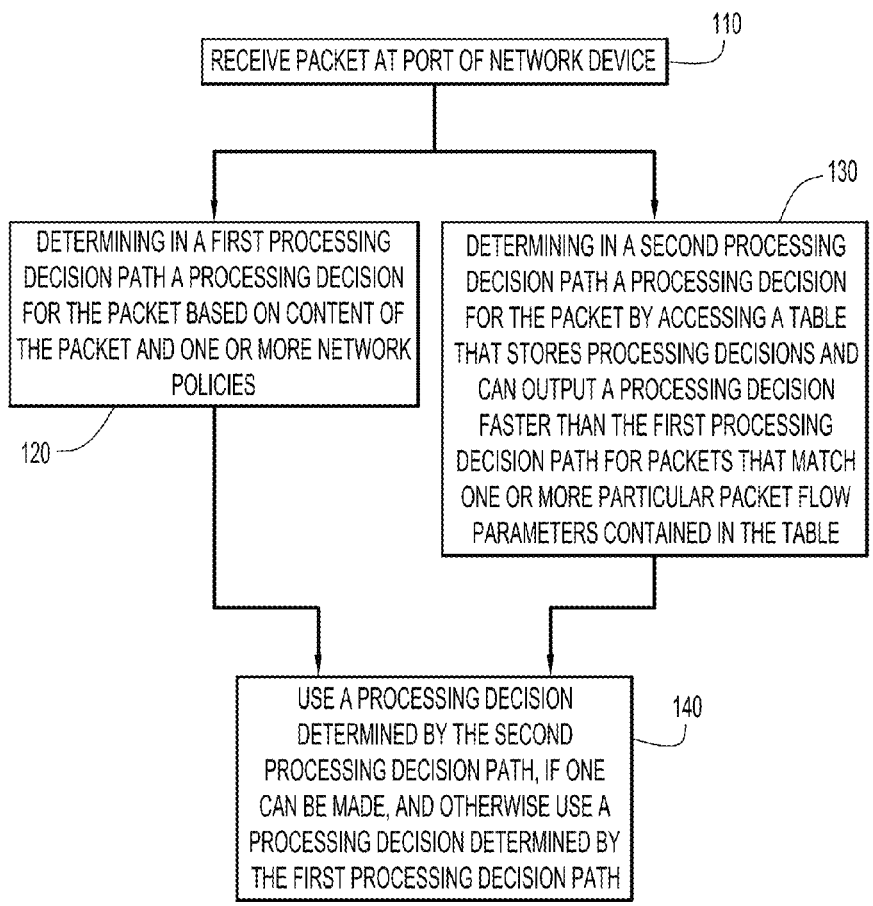
FIG. 4 is a flow chart depicting operations performed in a network device using multiple processing decision paths.

Reference is now made to FIG. 4 for a description of a flow chart 100 that summarizes the operations of a network device configured as presented herein for making ultra low latency processing decisions. At 110, a packet is received at a port of a network device. Often, the packet is stored in a buffer and queued for processing. At 120, using information obtained from the packet, a processing decision for the packet is determined in a first processing decision path based on content of the packet and one or more network policies. At 130, in parallel with the operations performed by the first processing decision path, a processing decision is determined in a second processing path by accessing a table that stores processing decisions and can output a processing decision faster than the first processing decision path for packets that match one or more particular packet flow parameters contained in the table. At 140, a processing decision determined by the second processing decision path, if one can be made, is used, and otherwise, a processing decision determined by the first processing decision path is used. As explained above in connection with FIG. 1, an override may be performed where one processing decision path overrides the other processing decision path, either the first processing decision path over the second processing decision path or the second processing decision path over the first processing decision path.

In summary, the single table look up function of the second processing decision path serves to process (e.g., switch) a packet at ultra low latency when there is a table match. Although the table is not scalable as every combination of a desired SIB entry must be enumerated (state explosion), the use of a table for fast processing decision determination has extremely low latency, requiring minimum of one table access.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description is intended by way of example only.

What is claimed is:

1. A method comprising:
   receiving a packet at a port of a network device;
   determining a processing decision in a first processing decision path based on content of the packet and one or more network policies;
   determining a processing decision in a second processing decision path by accessing a table storing processing decisions, and which second processing decision path can output a processing decision faster than the first processing decision path for packets that match one or more particular packet flow parameters contained in the table; and
   using a processing decision determined by the second processing decision path, if one can be made, and otherwise using a processing decision determined by the first processing decision path,
   wherein the processing decision in the first processing decision path and the processing decision in the second processing decision path each represents a selection from a set of possible decisions, the set of decisions comprising forwarding the packet, switching the packet, allowing the packet to bypass, and dropping the packet.

2. The method of claim 1, wherein determining in the second processing decision path comprises using a mask to perform a bitwise comparison for a partial or exact match to data stored in fields of the table.

3. The method of claim 1, wherein determining in the second processing decision path comprises performing a single lookup in the table for a match between one or more flow parameters of the packet and one or more particular packet flow parameters in an entry of the table.

4. The method of claim 3, wherein determining in the second processing decision path comprises performing the single lookup in the table using any combination of one or more of Layer 2 fields, Layer 3 fields, Layer 4 fields, Deep Packet Inspection fields, and user defined parameters of the packet to determine a match with one or more particular packet flow parameters stored in the table.

5. The method of claim 4, wherein determining in the second processing decision path comprises using a static manually configured key comprising a particular combination of one or more of Layer 2 fields, Layer 3 fields, Layer 4 fields, Deep Packet Inspection fields, and user defined parameters of the packet to determine a match with one or more particular packet flow parameters stored in the table.

6. The method of claim 1, wherein determining in the first processing decision path comprises examining Layer 2, Layer 3, Layer 4 and Deep Packet Inspection header fields of the packet in order to make a processing decision for the packet.

7. The method of claim 1, further comprising populating the table in the second processing decision path with information associated with a processing decision made by the first processing decision path for use in processing subsequently received packets.

8. The method of claim 1, further comprising programming the table of the second processing decision path with information for one or more processing decisions to be made for packets that satisfy one or more particular packet flow parameters.

9. The method of claim 1, further comprising overriding the processing decision determined by the second processing decision path, if it is made, and using the processing decision determined by the first processing decision path.

10. The method of claim 1, further comprising overriding the processing decision determined by the first processing decision path and using the processing decision determined by the second processing decision path.

11. The method of claim 1, wherein the determining in the first processing decision path and the determining in the second processing decision path comprise accessing a shared access control list table.

12. An apparatus comprising:
a plurality of ports configured to receive packets from a network and to output packets to the network;
a first processing decision path configured to determine a processing decision for a received packet based on content of the packet and one or more network policies;
a second processing decision path in parallel with the first processing decision path, the second processing decision path comprising a table storing processing decisions and capable of outputting a processing decision faster than the first processing decision path for packets that match one or more particular packet flow parameters contained in the table; and
a decision resolution logic unit configured to use a processing decision determined by the second processing decision path, if one can be made, and otherwise use a processing decision determined by the first processing decision path,
wherein the processing decision in the first processing decision path and the processing decision in the second processing decision path each represents a selection from a set of possible decisions, the set of decisions comprising forwarding the packet, switching the packet, allowing the packet to bypass, and dropping the packet.

13. The apparatus of claim 12, wherein the second processing decision path is configured to perform a single lookup in the table for a match between one or more flow parameters of the packet and one or more particular packet flow parameters in an entry of the table.

14. The apparatus of claim 13, wherein the second processing decision path is configured to perform the single lookup in the table using any combination of one or more of Layer 2 fields, Layer 3 fields, Layer 4 fields, Deep Packet Inspection fields, and user defined parameters of the packet to determine a match with one or more particular packet flow parameters stored in the table.

15. The apparatus of claim 12, wherein the first processing decision path comprises logic configured to examine Layer 2, Layer 3, Layer 4 and Deep Packet Inspection header fields of the packet to make a processing decision for the packet.

16. The apparatus of claim 12, wherein an output of the first processing decision path is coupled to the second processing decision path in order to populate the table of the second processing decision path with information associated with a processing decision made by the first processing decision path for use in processing subsequently received packets.

17. The apparatus of claim 12, further comprising a processor unit configured to program the table of the second processing decision path with information for one or more processing decisions to be made for packets that satisfy one or more particular packet flow parameters.

18. The apparatus of claim 12, wherein the decision resolution logic unit is configured to override the processing decision determined by the second processing decision path, if it is made, and using the processing decision determined by the first processing decision path.

19. The apparatus of claim 12, wherein the second processing decision path further includes a mask used to perform a bitwise comparison for a partial or exact match to data stored in fields of the table.

20. The apparatus of claim 12, further comprising a shared access control table, accessed by the first processing decision path and by the second processing decision path when determining the respective processing decisions.

21. A computer readable non-transitory storage media encoded with instructions that, when executed by a processor, cause the processor to:
for a packet received at a port of a network device, determine a processing decision in a first processing decision path based on content of the packet and one or more network policies;
in parallel with the first processing decision path, determine a processing decision in a second processing decision path by accessing a table storing processing decisions, and which second processing decision path can output a processing decision faster than the first processing decision path for packets that match one or more particular packet flow parameters contained in the table;
use the processing decision determined by the second processing decision path, if one can be made, and otherwise use the processing decision determined by the first processing decision path, wherein the processing decision in the first processing decision path and the processing decision in the second processing decision path each represents a selection from a set of possible decisions, the set of decisions comprising forwarding the packet, switching the packet, allowing the packet to bypass, and dropping the packet.

22. The computer readable non-transitory storage media of claim 21, wherein the instructions that cause the processor to determine in the second processing decision path comprises instructions that cause the processor to perform a single lookup in the table for a match between one or more flow parameters of the packet and one or more particular packet flow parameters in an entry of the table.

23. The computer readable non-transitory storage media of claim 22, wherein the instructions that cause the processor to perform the single lookup comprise instructions to perform the single lookup using any combination of one or more of Layer 2 fields, Layer 3 fields, Layer 4 fields, Deep Packet Inspection fields, and user defined parameters of the packet to determine a match with one or more particular packet flow parameters stored in the table.

24. The computer readable non-transitory storage media of claim 21, further comprising instructions that cause the processor to populate the table in the second processing decision path with information associated with a processing decision made by the first processing decision path for use in processing subsequently received packets.

25. The computer readable non-transitory storage media of claim 21, further comprising instructions that cause the processor to program the table of the second processing decision path with information for one or more processing decisions to be made for packets that satisfy one or more particular packet flow parameters.

26. The computer readable non-transitory storage media of claim 21, further comprising instructions that cause the processor to override the processing decision determined by the second processing decision path, if it is made, and using the processing decision determined by the first processing decision path.

27. The computer readable non-transitory storage media of claim 21, wherein the instructions that cause the processor to determine a processing decision in the second processing path further cause the processor to use a mask to perform a bitwise comparison for a partial or exact match to data stored in fields of the table.

28. The computer readable non-transitory storage media of claim 21, wherein the instructions that cause the processor to determine a processing decision in the first processing path comprise instructions that cause the processor to examine Layer 2, Layer 3, Layer 4 and Deep Packet Inspection header fields of the packet in order to make the processing decision for the packet.

29. The computer readable non-transitory storage media of claim 21, wherein the instructions that cause the processor to determine a processing decision in the first processing path and to determine a processing decision in the second processing path further cause the processor to access a shared access control list table when determining the respective processing decisions.

* * * * *